(12) United States Patent
Liu

(10) Patent No.: US 12,382,151 B2
(45) Date of Patent: Aug. 5, 2025

(54) MULTIFUNCTIONAL IMAGE-SHOOTING AND SOUND-RECEIVING DEVICE

(71) Applicant: Magic Control Technology Corporation, New Taipei (TW)

(72) Inventor: Pei-Chung Liu, New Taipei (TW)

(73) Assignee: Magic Control Technology Corporation, New Taipei (TW)

( * ) Notice: Subject to any disclaimer, the term of this patent is extended or adjusted under 35 U.S.C. 154(b) by 218 days.

(21) Appl. No.: 18/128,615

(22) Filed: Mar. 30, 2023

(65) Prior Publication Data

US 2023/0336849 A1 Oct. 19, 2023

(30) Foreign Application Priority Data

Apr. 18, 2022 (TW) .................................. 111114685

(51) Int. Cl.
*H04N 23/50* (2023.01)
*G03B 31/00* (2021.01)
(Continued)

(52) U.S. Cl.
CPC ............. *H04N 23/50* (2023.01); *G03B 31/00* (2013.01); *H04N 23/64* (2023.01);
(Continued)

(58) Field of Classification Search
CPC ........ G03B 29/00; G03B 17/48; G03B 31/00; H04R 1/083; H04R 2499/10
See application file for complete search history.

(56) References Cited

U.S. PATENT DOCUMENTS 5,387,955 A 2/1995 Cocca
7,283,788 B1 * 10/2007 Posa ...................... H04N 7/142
  348/169
(Continued)

FOREIGN PATENT DOCUMENTS

CN 101918892 A 12/2010
CN 105979126 A 9/2016
(Continued)

OTHER PUBLICATIONS

European search Report of European Application No. 23165432.8-1020/4270106.
(Continued)

*Primary Examiner* — Christopher E Mahoney
(74) *Attorney, Agent, or Firm* — Millen, White, Zelano & Branigan P.C.; William F. Nixon

(57) ABSTRACT

Provided is a multifunctional image-shooting and sound-receiving device, including a controller, a built-in microphone, a switching unit, an adjustment unit, a drive unit, a sensor and a motor. The built-in microphone is connected to the controller and receives at least one microphone sound signal. The switching unit is connected to and transmits a switching signal to the controller. The adjustment unit is connected to and transmits an adjustment signal to the controller. The drive unit is connected to and receives a drive control signal from the controller. The sensor is connected to and receives a sensing control signal from the controller, and transmits sensing information thereto. The motor is connected to and receives a driving signal from the drive unit, and integrated with a lens. The controller switches the multifunctional image-shooting and sound-receiving device to one of a first mode and a second mode according to the switching signal.

1 Claim, 11 Drawing Sheets

(51) Int. Cl.
*H04N 23/60* (2023.01)
*H04N 23/667* (2023.01)
*H04R 1/08* (2006.01)

(52) U.S. Cl.
CPC .......... *H04N 23/667* (2023.01); *H04R 1/083* (2013.01); *H04R 2499/10* (2013.01)

(56) References Cited

U.S. PATENT DOCUMENTS

| | | |
|---|---|---|
| 2006/0044453 A1 | 3/2006 | Lee |
| 2014/0092251 A1* | 4/2014 | Troxel .................. H04N 23/51 |
| | | 348/148 |
| 2014/0240219 A1 | 8/2014 | Kim et al. |
| 2015/0009344 A1 | 1/2015 | Konicek |
| 2017/0195568 A1* | 7/2017 | Leizerovich, Jr. ...... G03B 37/04 |
| 2017/0289668 A1* | 10/2017 | Kim .................... H04M 1/6066 |
| 2019/0251386 A1 | 8/2019 | Piekniewski et al. |
| 2020/0137492 A1* | 4/2020 | Hirose .................. H04R 3/005 |

FOREIGN PATENT DOCUMENTS

| | | |
|---|---|---|
| JP | 2005208525 | 4/2005 |
| TW | I606292 B | 9/2014 |
| TW | M604409 U | 11/2020 |

OTHER PUBLICATIONS

First Office Action in Corresponding TW Application No. 111114685 dated Oct. 14, 2022.
English Translation of Search Report from First Office Action in Corresponding TW Application No. 111114685 dated Oct. 14, 2022.
English Abstract of CN-105979126, Publication Date: Sep. 28, 2016.
English Abstract of CN-101918892, Publication Date: Dec. 15, 2010.
English Abstract of TW-M604409, Publication Date: Nov. 21, 2020.

* cited by examiner

MULTIFUNCTIONAL IMAGE-SHOOTING AND SOUND-RECEIVING DEVICE

CROSS-REFERENCE TO RELATED APPLICATION

This application claims the priority of Taiwanese patent application No. 111114685, filed on Apr. 18, 2022, which is incorporated herewith by reference.

BACKGROUND OF THE INVENTION

1. Field of the Invention

The present invention relates to an image-shooting and sound-receiving device, and in particular to a multi-functional image-shooting and sound-receiving device with multiple operation modes.

2. The Prior Arts

The existing webcam devices usually can focus automatically to perform image-shooting in different situations. The webcam devices used for conferences also need a better sound-receiving effect. However, the focus function usually will affect the shooting effect due to the changes of the ambient environment or the image-shooting object, and the sound-receiving effect also will be affected by the ambient environment and the relative position and distance between the microphone and the sound source.

Therefore, it is needed to provide a multifunctional image-shooting and sound-receiving device that can perform image-shooting in different ambient environments or image-shooting objects, and can clearly receive sound in different ambient environments, and relative positions and distances between the microphone and the sound source.

SUMMARY OF THE INVENTION

To solve the above-mentioned problems, the present invention provides a multifunctional image-shooting and sound-receiving device including a controller, at least one built-in microphone, a switching unit, an adjustment unit, a drive unit, a sensor and a motor. The built-in microphone is connected to the controller and receives at least one microphone sound signal. The sensor is connected to the controller and receives a sensing control signal from the controller, and transmits sensing information to the controller. The motor is connected to the drive unit and receives a driving signal from the drive unit, and integrated with a lens. The adjustment unit is connected to the controller and transmits an adjustment signal to the controller. The drive unit is connected to the controller and receives a drive control signal from the controller. The switching unit is connected to the controller and transmits a switching signal to the controller. The controller switches the multifunctional image-shooting and sound-receiving device to one of a first mode and a second mode according to the switching signal.

According to an embodiment of the present invention, when the switching signal switches the multi-functional image-shooting and sound-receiving device to the first mode, the controller receives the adjustment signal and generates the drive control signal according to the adjustment signal. The drive unit generates the driving signal according to the drive control signal.

According to an embodiment of the present invention, when the switching signal switches the multifunctional image-shooting and sound-receiving device to the second mode, the controller computes and generates the drive control signal according to the sensing information transmitted by the sensor. The drive unit generates the driving signal according to the drive control signal.

According to an embodiment of the present invention, the multifunctional image-shooting and sound-receiving device further includes a charging unit, a wireless microphone module and a wireless module. The charging unit is connected to the controller and transmits a connection charging signal. The wireless microphone module is connected to the charging unit for charging and is detachable from the charging unit. The wireless module is connected to the controller and receives a wireless control signal from the controller. When the wireless microphone module is detached from the charging unit, the wireless module receives the wireless control signal to communicate with the wireless microphone module, and thus the wireless module receives sound. When the wireless microphone module is connected to the charging unit, the controller turns off the wireless microphone module according to the connection charging signal, and thus the built-in microphone receives sound.

Therefore, the multifunctional image-shooting and sound-receiving device of the present invention can perform image-shooting in different ambient environments or image-shooting objects, and clearly receive sound in different ambient environments, and relative positions and distances between the microphone and the sound source.

DETAILED DESCRIPTION OF THE PREFERRED EMBODIMENT

Figure 1:
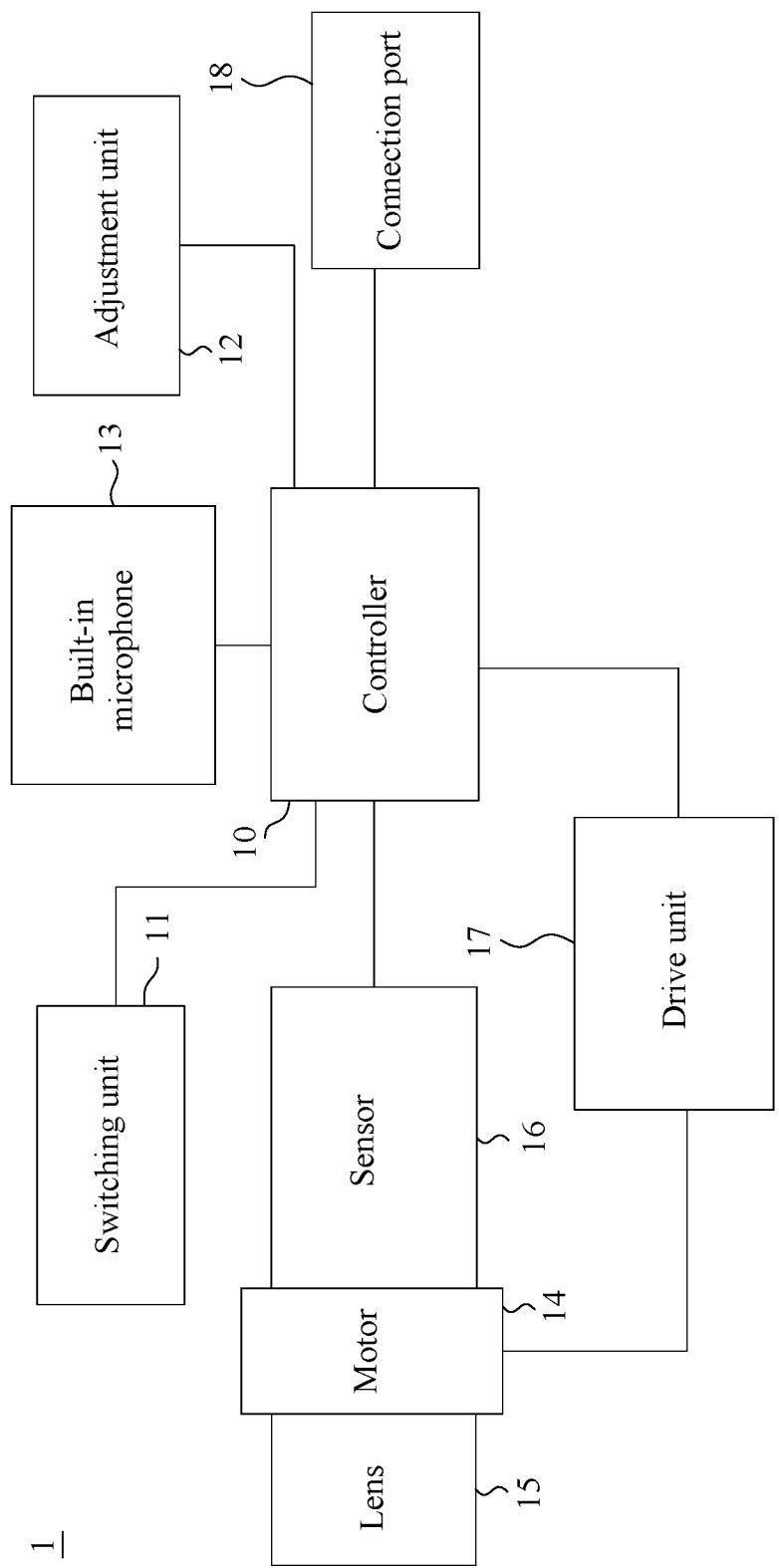
FIG. 1 is a systematic diagram of an image-shooting and sound-receiving device according to an embodiment of the present invention.

Please refer to FIG. 1, which is a systematic diagram of an image-shooting and sound-receiving device according to an embodiment of the present invention. As shown in FIG. 1, the multifunctional image-shooting and sound-receiving device 1 of the present invention includes a controller 10, a built-in microphone 13, a switching unit 11, an adjustment unit 12, a drive unit 17, a sensor 16, a lens 15, and a motor 14. The built-in microphone 13 is connected to the controller 10 and can receive at least one microphone sound signal. The switching unit 11 is connected to the controller 10 and transmits a switching signal to the controller 10. The adjustment unit 12 is connected to the controller 10 and transmits an adjustment signal to the controller 10. The drive unit 17 is connected to the controller 10 and receives a drive control signal from the controller 10. The sensor 16 is connected to the controller 10, receives a sensing control signal from the controller 10, and transmits sensing information to the controller 10. The motor 14 is connected to the drive unit 17, receives a driving signal from the drive unit 17, and is integrated with the lens 15. The controller 10 switches the multifunctional image-shooting and sound-receiving device 1 to one of a first mode and a second mode according to the switching signal transmitted by the switching unit 11. In this embodiment, the first mode is a manual mode, and the second mode is an automatic mode.

Figure 3A:
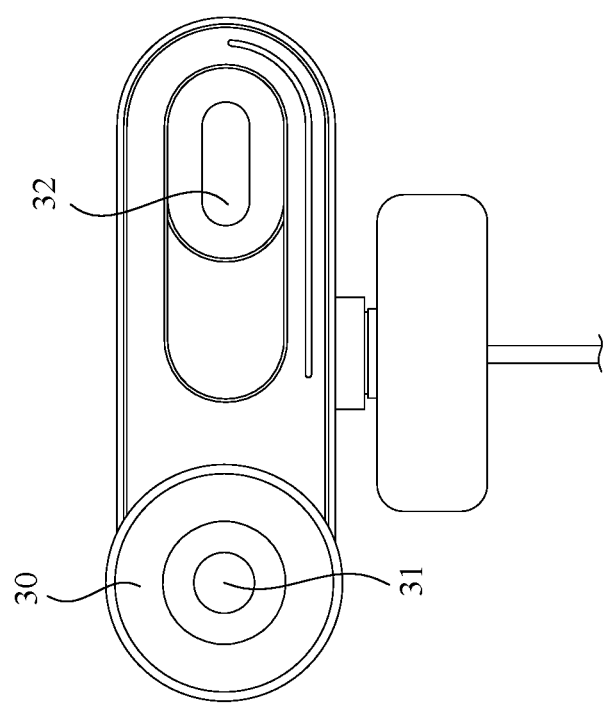
FIG. 3A is a front view of the image-shooting and sound-receiving device of the embodiment in FIG. 1.
Figure 3B:
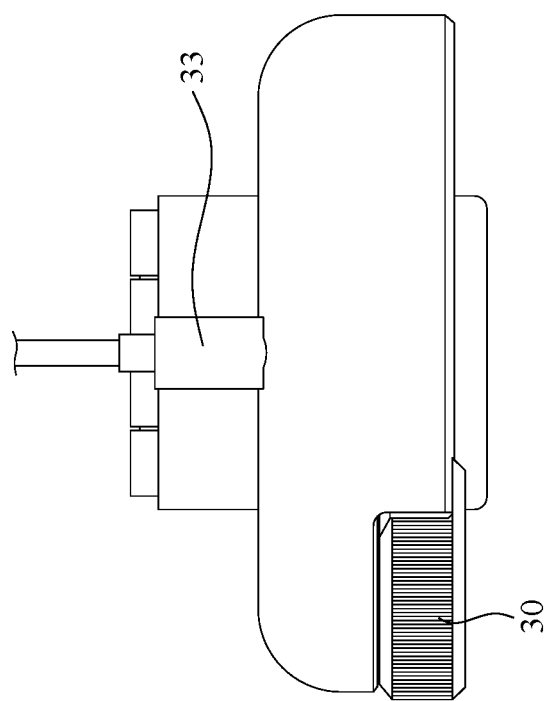
FIG. 3B is a top view of the image-shooting and sound-receiving device of the embodiment in FIG. 1.
Figure 3C:
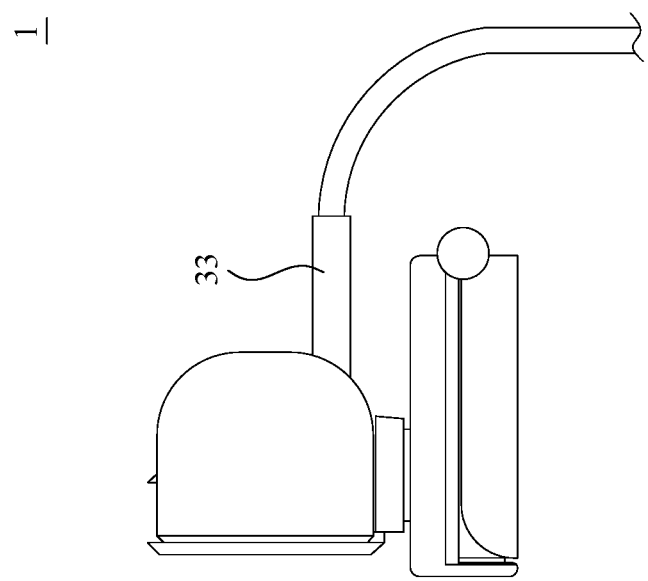
FIG. 3C is a side view of the image-shooting and sound-receiving device of the embodiment in FIG. 1.

Please refer to FIGS. 3A to 3C, which are a front view, a top view, and a side view of the multifunctional image-shooting and sound-receiving device 1, respectively. A connection port 18 of the multifunctional image-shooting and sound-receiving device 1 is connected through a USB-C cable 33 to a computing device. When the switching signal switches the multifunctional image-shooting and sound-receiving device 1 to the manual mode, the controller 10 receives the adjustment signal and generates the drive control signal according to the adjustment signal, and the drive unit 17 generates the driving signal according to the drive control signal. That is, when the user generates the switching signal through the switching unit 11 (that is, a switching button 31) to switch the multifunctional image-shooting and sound-receiving device 1 to the manual mode, the user can operate the adjustment unit 12 (i.e., a rotary knob 30) to generate the adjustment signal, so that the controller 10 receives the adjustment signal and generates the drive control signal according to the adjustment signal, the drive unit 17 generates the driving signal according to the drive control signal, the driving signal and the sensing control signal drives the motor 14 to change the focal length of the lens 15 (the user can use a slide cover 32 to open/close the lens 15).

In contrast, when the switching signal switches the multifunctional image-shooting and sound-receiving device 1 to the automatic mode, the controller 10 computes and generates the drive control signal according to the sensing information transmitted by the sensor 16, and the drive unit 17 generates the driving signal according to the drive control signal. That is, when the user generates the switching signal through the switching unit 11 (i.e., the switching button 31) and switches the multifunctional image-shooting and sound-receiving device 1 to the automatic mode, the controller 10 automatically generates the drive control signal (at this time, the adjustment signal generated by the user through the rotary knob 30 will not be converted into a drive control signal), the drive unit 17 generates the driving signal according to the drive control signal, and the driving signal and the sensing control signal will drive the motor 14 to change the focal length of the lens 15.

According to the embodiment of the present invention, the controller 10 may include or be implemented as a high-performance vision processor, such as Rockchip Electronics Co., Ltd.'s product RV1126, or SigmaStar Technology Corp.'s product SAC8539.

According to the embodiment of the present invention, the drive unit 17 may include or be implemented as a micro-actuator driver IC, such as Fitipower Integrated Technology Inc.'s product FP5502.

Figure 2:
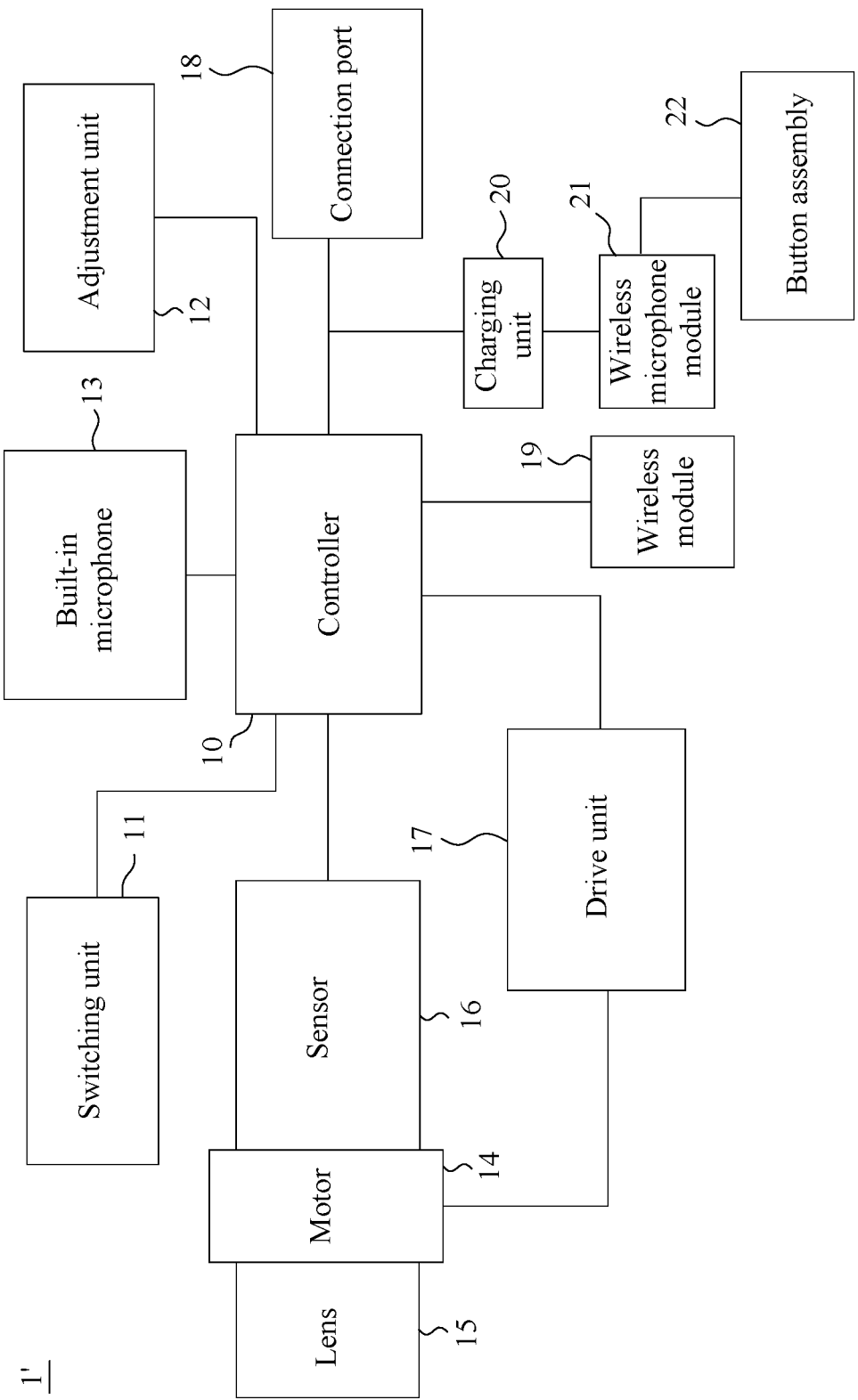
FIG. 2 is a systematic diagram of an image-shooting and sound-receiving device according to another embodiment of the present invention.

Please refer to FIG. 2, which is a systematic diagram of an image-shooting and sound-receiving device 1' according to another embodiment of the present invention. As shown in FIG. 2, compared with the multifunctional image-shooting and sound-receiving device 1 of FIG. 1, the multifunctional image-shooting and sound-receiving device 1' further includes a charging unit 20, a wireless microphone module 21, a wireless module 19, and a button assembly 22. The charging unit 20 is connected to the controller 10 and transmits a connection charging signal. The wireless microphone module 21 is connected to the charging unit 20 for charging, and can be detached from the charging unit 20. The wireless module 19 is connected to the controller 10 and receives a wireless control signal from the controller 10. The wireless microphone module 21 includes a microphone, a wireless communication controller, and a battery, wherein the wireless communication controller is paired with the wireless module 19 for communication. The button assembly 22 is connected to the wireless microphone module 21, and the button assembly 22 may include a power switch, a mute switch, and other switching switches (such as a switch for remote controlling the switching unit 11).

Please refer to FIGS. 4A to 4D, which are respectively a front view, a top view, a side view, and a perspective view viewed from a rear side of the multifunctional image-shooting and sound-receiving device 1'. The connection port 18 of the multifunctional image-shooting and sound-receiving device 1' is connected through a USB-C cable 42 to a computing device. When the user generates the switching signal through the switching unit 11 (that is, a switching button 31') to switch the multifunctional image-shooting and sound-receiving device 1' to the manual mode, the user can operate the adjustment unit 12 (i.e., a rotary knob 30') to generate the adjustment signal, so that the controller 10 receives the adjustment signal and generates the drive control signal according to the adjustment signal, the drive unit 17 generates the driving signal according to the drive control signal, and the driving signal drives the motor 14 to change the focal length of the lens 15 (the user can open/close the lens 15 by sliding the lens 15).

In contrast, when the user generates the switching signal through the switching unit 11 (i.e., the switching button 31') to switch the multifunctional image-shooting and sound-receiving device 1' to the automatic mode, the controller 10 automatically computes and generates the drive control signal according to the sensing information transmitted by the sensor 16 (at this time, the adjustment signal generated by the user through the rotary knob 30' will not be converted into a drive control signal), and the drive unit 17 generates the driving signal according to the drive control signal, and the driving signal and the sensing control signal will drive the motor 14 to change the focal length of the lens 15.

Figure 4A:
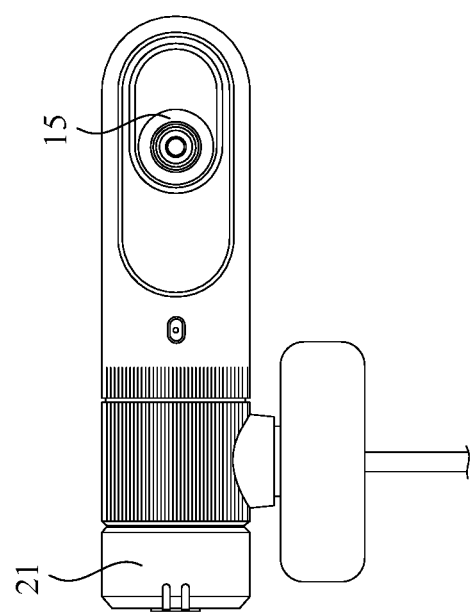
FIG. 4A is a front view of the image-shooting and sound-receiving device of the embodiment in FIG. 2.
Figure 4B:
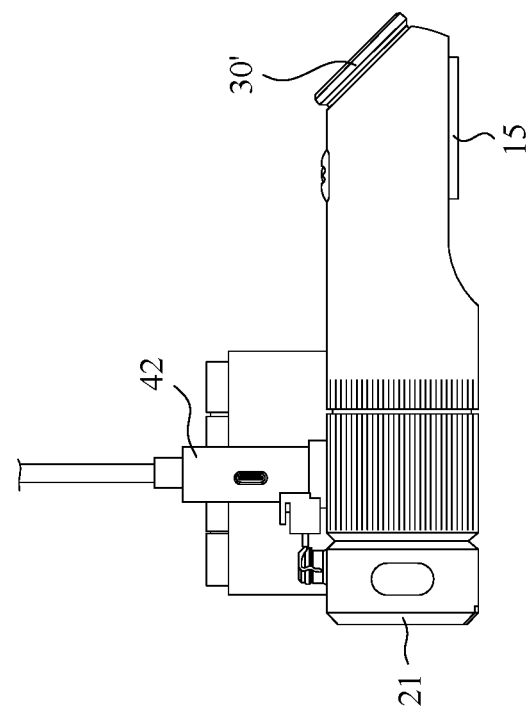
FIG. 4B is a top view of the image-shooting and sound-receiving device of the embodiment in FIG. 2.
Figure 4C:
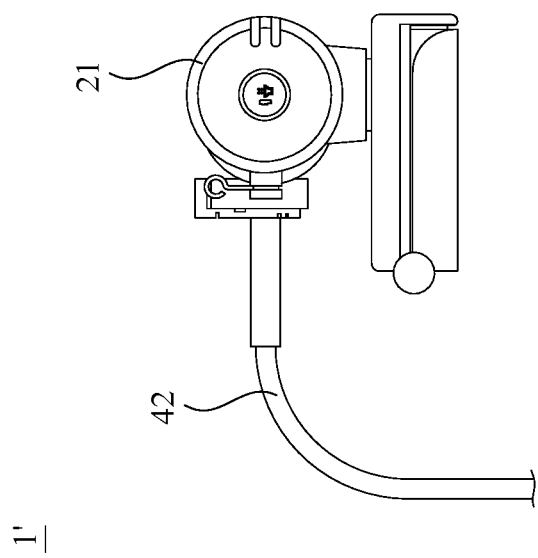
FIG. 4C is a side view of the image-shooting and sound-receiving device of the embodiment in FIG. 2.
Figure 4D:
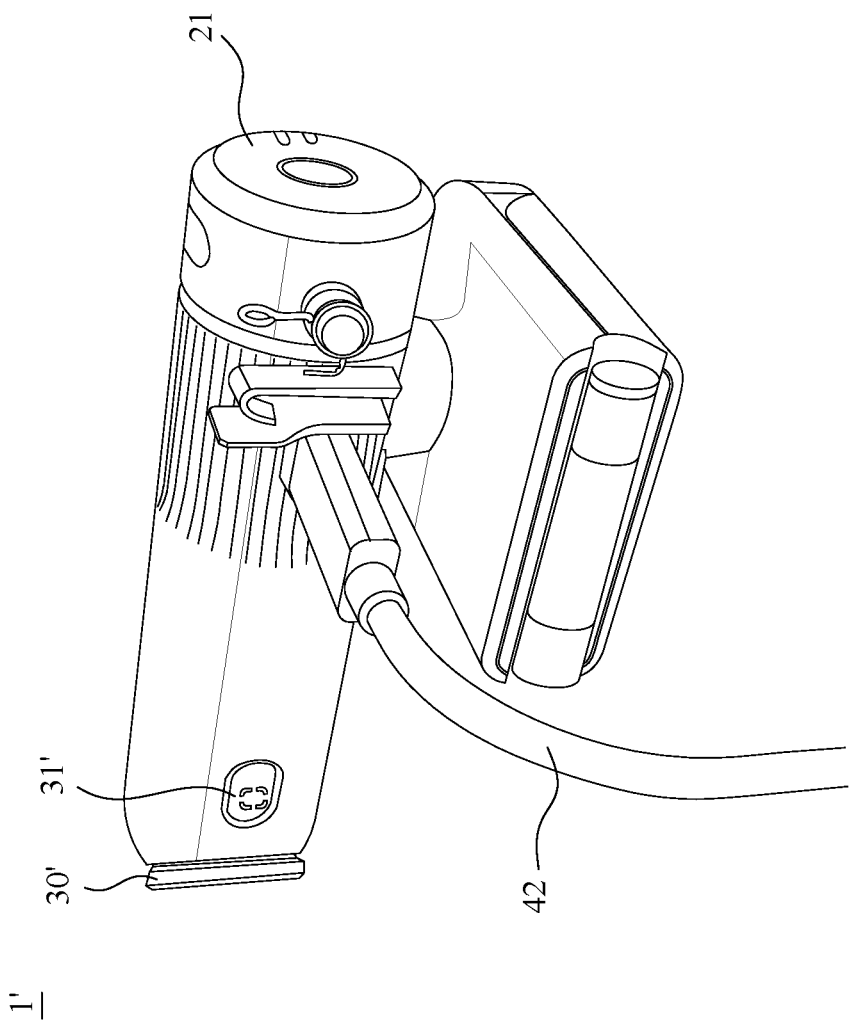
FIG. 4D is a perspective view of the image-shooting and sound-receiving device of the embodiment in FIG. 2 viewed from a rear side thereof.
Figure 4E:
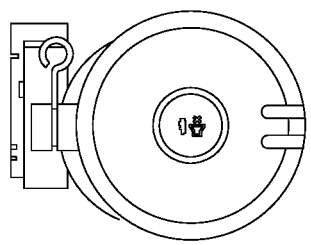
FIG. 4E is a front view of a wireless microphone module in FIGS. 4A-4D.
Figure 4F:
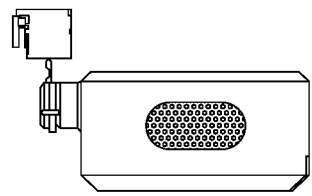
FIG. 4F is a side view of the wireless microphone module in FIGS. 4A-4D.

In addition, as shown in FIGS. 4E and 4F, when the wireless microphone module 21 is detached from the charging unit 20, the wireless module 19 receives the wireless control signal to communicate with the wireless microphone module 21, and thus the wireless module 19 receives sound. In contrast, when the wireless microphone module 21 is connected to the charging unit 20, the charging unit 20 transmits a connection charging signal to the controller 10 to disable the sound-receiving of the wireless microphone module 21 and enable the sound-receiving of the built-in microphone 13. At this time, both the multifunctional image-shooting and sound-receiving device 1' and the multifunctional image-shooting and sound-receiving device 1 can only receive sound through the built-in microphone 13.

According to the embodiment of the present invention, the wireless module 19 may include or be implemented as, for example, Telink Semiconductor Co. Ltd.'s product TLSR951x.

According to the embodiment of the present invention, the charging unit 20 may include or be implemented as a battery charger IC, such as Fitipower Integrated Technology Inc.'s product FP6908.

In summary, the multifunctional image-shooting and sound-receiving device of the present invention can perform image-shooting in different ambient environments or image-shooting objects by switching the manual/automatic focus adjustment mode, and clearly receive sound in different ambient environments, and relative positions and distances between the microphone and the sound source by the detachable wireless microphone module.

The present invention is not limited to the above-described embodiments, and it is obvious to those skilled in the art that various modifications and variations can be made to the present invention without departing from the spirit or scope of the present invention.

Accordingly, these modifications and variations made to this invention fall within the scope of the appended claims and the equivalents.

What is claimed is:

1. A multifunctional image-shooting and sound-receiving device, comprising:
    a controller;
    at least one built-in microphone connected to the controller and receiving at least one microphone sound signal;
    a switching unit connected to the controller and transmitting a switching signal to the controller;
    an adjustment unit connected to the controller and transmitting an adjustment signal to the controller;
    a drive unit connected to the controller and receiving a drive control signal from the controller;
    a sensor connected to the controller and receiving a sensing control signal from the controller, and transmitting sensing information to the controller;
    a motor connected to the drive unit and receiving a driving signal from the drive unit, and integrated with a lens;
    a charging unit connected to the controller and transmitting a connection charging signal;
    a wireless microphone module connected to the charging unit for charging and being detachable from the charging unit; and
    a wireless module connected to the controller and receiving a wireless control signal from the controller,
    wherein the controller switches the multifunctional image-shooting and sound-receiving device to one of a first mode and a second mode according to the switching signal,
    wherein when the switching signal switches the multifunctional image-shooting and sound-receiving device to the first mode, the controller receives the adjustment signal and generates the drive control signal according to the adjustment signal, the drive unit generates the driving signal according to the drive control signal,
    wherein when the switching signal switches the multifunctional image-shooting and sound-receiving device to the second mode, the controller computes and generates the drive control signal according to the sensing information transmitted by the sensor, the drive unit generates the driving signal according to the drive control signal, and
    wherein when the wireless microphone module is detached from the charging unit, the wireless module receives the wireless control signal to communicate with the wireless microphone module, and thus the wireless module receives sound; when the wireless microphone module is connected to the charging unit, the controller turns off the wireless microphone module according to the connection charging signal, and thus the built-in microphone receives sound.

\* \* \* \* \*